United States Patent [19]

Sweeney

[11] 4,248,681

[45] Feb. 3, 1981

[54] GENERATION OF CHLORINE/CHLORINE DIOXIDE MIXTURES

[76] Inventor: Charles T. Sweeney, 448 Earle Rd., Hewitt, Tex. 76643

[21] Appl. No.: 121,115

[22] Filed: Feb. 13, 1980

Related U.S. Application Data

[63] Continuation-in-part of Ser. No. 92,645, Nov. 8, 1979.

[51] Int. Cl.³ .................. C25B 1/22; C25B 1/26; C25B 1/46
[52] U.S. Cl. ................. 204/103; 204/128; 204/256; 204/260
[58] Field of Search ........... 204/103, 128, 252, 254, 204/256, 260

[56] References Cited

U.S. PATENT DOCUMENTS

| | | | |
|---|---|---|---|
| 3,732,157 | 5/1973 | Dewitt | 204/256 X |
| 3,763,006 | 10/1973 | Callerame | 204/103 |
| 3,801,488 | 4/1974 | Okuhara et al. | 204/260 X |
| 3,904,496 | 9/1975 | Harke et al. | 204/128 X |
| 4,129,484 | 12/1978 | Larsson | 204/103 X |
| 4,172,774 | 10/1979 | Moeglich | 204/252 X |

Primary Examiner—Howard S. Williams
Assistant Examiner—D. R. Valentine
Attorney, Agent, or Firm—Neal J. Mosely

[57] ABSTRACT

An electrolytic generator is disclosed for use in treating water in swimming pools, baths, reservoirs, sewage etc., and in bleaching chemical pulp. The generator is of the type consisting of two sealed compartments separated by an ion-permeable membrane and having a cathode in one compartment and an an anode in the other Hydrogen is evolved from the cathode compartment and a chlorine/chlorine dioxide mixture from the anode compartment. In this generator, an electrically neutral or bipolar electrode (one not connected in the anode cathode circuit) is positioned adjacent to the anode o between the anode and the cathode adjacent to the ion-permeable membrane in the anode compartment This electrolytic generator is characterized by a more rapid start up and generates a mixture of chlorine and chlorine dioxide at both the anode and the neutral electrode.

18 Claims, 16 Drawing Figures

GENERATION OF CHLORINE/CHLORINE DIOXIDE MIXTURES

CROSS-REFERENCE TO RELATED APPLICATION

This application is a continuation-in-part of copending patent application Ser. No. 92,645, filed Nov. 8, 1979.

BACKGROUND OF THE INVENTION

1. Field of the Invention

This invention relates to new and useful improvements in electrolytic generators and to methods of generating mixtures of chlorine and chlorine dioxide and to systems of apparatus for generating mixtures of chlorine and chlorine dioxide for treating bodies of water, such as, swimming pools, baths, reservoirs, sewage, etc., and for bleaching chemical pulp, etc.

2. Brief Description of the Prior Art

The use of chlorine for disinfecting bodies of water, such as, swimming pools, baths, reservoirs, sewage, etc. is well known. In the past, chlorine has usually been supplied by direct application of chlorine gas from tanks containing the gas under pressure. There have also been a number of attempts to provide chlorine gas on a more limited scale by continuous electrolytic generating equipment.

The use of chlorine dioxide in disinfecting bodies of water and in bleaching chemical pulp is well known. Chlorine dioxide is a dangerous and explosive gas and is usually produced as an aqueous solution at the point of usage by chemical decomposition of chlorite salts. The production of chlorine dioxide electro-chemically from chlorides is unknown in the literature.

Lindstaedt U.S. Pat. No. 2,887,444 discloses a system in which a body of water, such as, a swimming pool, is provided with a low concentration of dissolved common salt and a stream of water is removed from the main body and elctrolyzed to produce chlorine and the chlorine and water stream returned to the main body of water.

Murray U.S. Pat. No. 3,223,242 discloses another type of electrolytic cell for generating chlorine for introduction into a stream of water removed from and introduced back into a swimming pool or other body of water.

Richards U.S. Pat. No. 3,282,823 discloses an electrolytic cell for production of chlorine positioned in-line for introducing chlorine into a stream of water removed from and reintroduced into a swimming pool.

Other chlorinating systems using electrolytic cells for production of chlorine for chlorinating bodies of water are shown in Murray U.S. Pat. No. 2,361,663, Oldershaw U.S. Pat. No. 3,351,542, Colvin U.S. Pat. No. 3,378,479, Kirkham U.S. Pat. No. 3,669,857, and Yates U.S. Pat. No. 4,097,356. These electrolytic cells are disclosed in a variety of configurations and most of the cells utilize ion-permeable membranes separating the anode and cathode compartments.

Ion-permeable membrane technology used in electrolytic cells is well developed. Ion-permeable membranes used in electrolytic cells have ranged from asbestos diaphragms to carboxylate resin polymers to perfluorosulfonic acid polymer membranes. The perfluorosulfonic acid membranes were developed by DuPont for use in electrolytic cells.

Dotson U.S. Pat. No. 3,793,163 discloses the use of Dupont perfluorosulfonic acid membranes in electrolytic cells and makes reference to U.S. Pat. Nos. 2,636,851; 3,017,338; 3,560,568; 3,496,077; 2,967,807; 3,282,875 and British Pat. No. 1,184,321 as disclosing such membranes and various uses thereof.

Walmsley U.S. Pat. No. 3,909,378 discloses another type of fluorinated ion exchange polymer used in membranes for electrolytic cells for electrolysis of salt solutions.

Further discussion of membrane technology used in electrolytic cells may be found in Butler U.S. Pat. No. 3,017,338, Danna U.S. Pat. No. 3,775,272, Kircher U.S. Pat. No. 3,960,697, Carlin U.S. Pat. No. 4,010,085 and Westerlund U.S. Pat. No. 4,069,128.

Discussion of perfluorosulfonic acid membranes is also discussed in the technical literature, e.g., Dupont Magazine, May-June 1973, pages 22-25 and a paper entitled "Perfluorinated Ion Exchange Membrane" by Grot, Munn and Walmsley, presented to the 141st National Meeting of the Electro-Chemical Society, Houston, Texas, May 7-11, 1972.

The structure of electrodes used in electrolytic cells is set forth in most of the patents listed above. Additionally, the following U.S. Pat. Nos. disclose particular configurations of anodes or cathodes used in electrolytic cells.

Giacopelli 3,375,184 discloses an electrolytic cell with controlable multiple electrodes which are flat plates of wedge-shaped configuration.

Ettel 3,821,097 discloses the use of flat plates in electroplating cells.

Lohrberg 3,951,767 discloses the use of flat plate electrolytic anodes having grooves along the bottoms thereof for conducting gas bubbles generated in the electrolytic process.

Andreoli U.S. Pat. No. 565,953 discloses electroplating apparatus having a plurality of metal screens which are not connected in the electric circuit and function to plate out the metal being separated by the electrolysis.

In "The $ClO_2$ content of chlorine obtained by electrolysis of NaCl", Electrochemical Technology 5, 56–58 (1967) Westen and Hoogland report that $ClO_2$ is not produced in the electrolysis of NaCl in the absence of chlorates.

SUMMARY OF THE INVENTION

One of the objects of this invention is to provide a new and improved system of treatment and method of treatment of bodies of water, such as, swimming pools, baths, reservoirs, sewage, etc., and bleaching of chemical pulp, etc., utilizing an electrolytic cell of novel construction.

Another object of this invention is to provide a new and improved electrolytic cell for production of mixtures of chlorine and chlorine dioxide for treatment of bodies of water and bleaching.

Another object of this invention is to provide a new and improved electrolytic cell having an arrangement comprising a plurality of anodes, only one of which is electrically connected or which are connected at different potentials, which produces a mixture of chlorine and chlorine dioxide.

Still another object of this invention is to provide a method of producing a mixture of chlorine and chlorine dioxide by electrolysis of an aqueous solution of a chloride salt.

Still another object of this invention is to provide a method and apparatus in which chlorine dioxide is produced and may be recovered, free of chlorine, by electrolysis of an aqueous solution of chloride salt.

Other objects of this invention will become apparent from time to time throughout the specification and the claims as hereinafter related.

The foregoing objects are achieved by use of electrolytic generator of the type consisting of two sealed compartments, separated by ion-permeable membrane, having a cathode in one compartment and an anode in the other compartment. Hydrogen is evolved from the cathode compartment and a chlorine containing mixture from the anode compartment for use in bleaching or in treating bodies of water, such as, swimming pools, baths, reservoirs, sewage, etc. In the improved electrolytic generator, an electrically neutral or bipolar electrode (one not connected in the anode-cathode circuit or connected at a different potential from the anode) is positioned adjacent to the anode or between the anode and the cathode adjacent to the ion-permeable membrane in the anode compartment. The electrically neutral or bipolar electrode is positioned in line between the anode and the cathode. The anode, cathode and electrically neutral or bipolar electrode are preferably flat plate electrodes, although other configurations, such as, cylindrical electrodes may be used. The generator is characterized by a more rapid start up when energized with electricity. The generator is further characterized by generating a mixture of chlorine and chlorine dioxide at both the anode and the neutral or bipolar electrode, and under some conditions may produce substantially pure chlorine dioxide.

DESCRIPTION OF THE PREFERRED EMBODIMENTS OF THE APPARATUS

Figure 1:
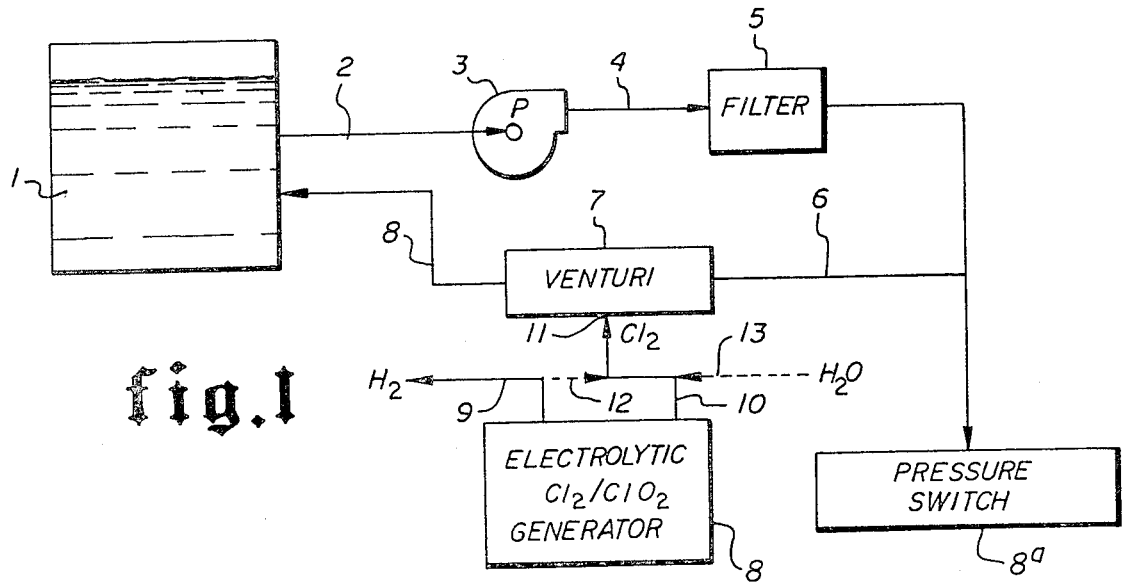
FIG. 1 is a schematic view of a treatment system for a body of water using an electrolytic generator for producing a chlorine-containing mixture.

Referring to the drawings by numeral of reference and more particularly to FIG. 1, there is shown a system for treatment of a body of water, such as, a swimming pool, bath, reservoir, body of sewage, etc. A body of water 1 is connected by a conduit 2 to a pump 3. The outlet side of pump 3 is connected by conduit 4 to a filter 5. The other side of filter 5 is connected by conduit 6 to the inlet side of the venturi mixer 7, the outlet side of which is connected by conduit 8 back to the body of water 1. The system shown provides for circulation of water from the body of water 1 by pump 3 accompanied by filtration in filter 5 and mixing in venturi mixer 7 before the water is returned to the main body of water 1. The system includes an electrolytic generator 8 which will be described more fully hereinafter.

Electrolytic generator 8 produces hydrogen in the cathode compartment which is discharged as is indicated at 9. The generator produces a chlorine-chlorine dioxide mixture in the anode compartment which is discharged as indicated at 10 and introduced into the venturi mixer 7 as indicated at 11. Optionally, the hydrogen produced in the chlorine generator may be mixed with the chlorine-chlorine dioxide mixture as indicated at 12 and introduced as a mixture into the venturi mixer 7.

Also, the mixture of chlorine dioxide and chlorine (optionally including hydrogen) may be mixed with a stream of water as indicated at 13 (also see FIG. 16) for introduction into the venturi mixer 7. The introduction of water as indicated at 13 may be in any conventional conduit system or may be in the form of a water-gas aspirator system in which the flow of water sucks in the mixture of chlorine dioxide and chlorine (and optionally hydrogen) gas discharged from chlorine generator 8. Systems of this general type which produce only chlorine are shown in Lindsteadt U.S. Pat. No. 2,887,444, Murray U.S. Pat. No. 3,223,242 and Yates U.S. Pat. No. 4,097,356.

The apparatus as shown can be operated in conjunction with conventional timing circuits as in various prior patents cited above and may also be operated in conjunction with switches that are energized simultaneously with the water circulating pump or the electrolytic generator may be energized in response to a flow switch or a pressure switch 8a so that it operates whenever water is circulating through the system shown in FIG. 1.

Figure 2:
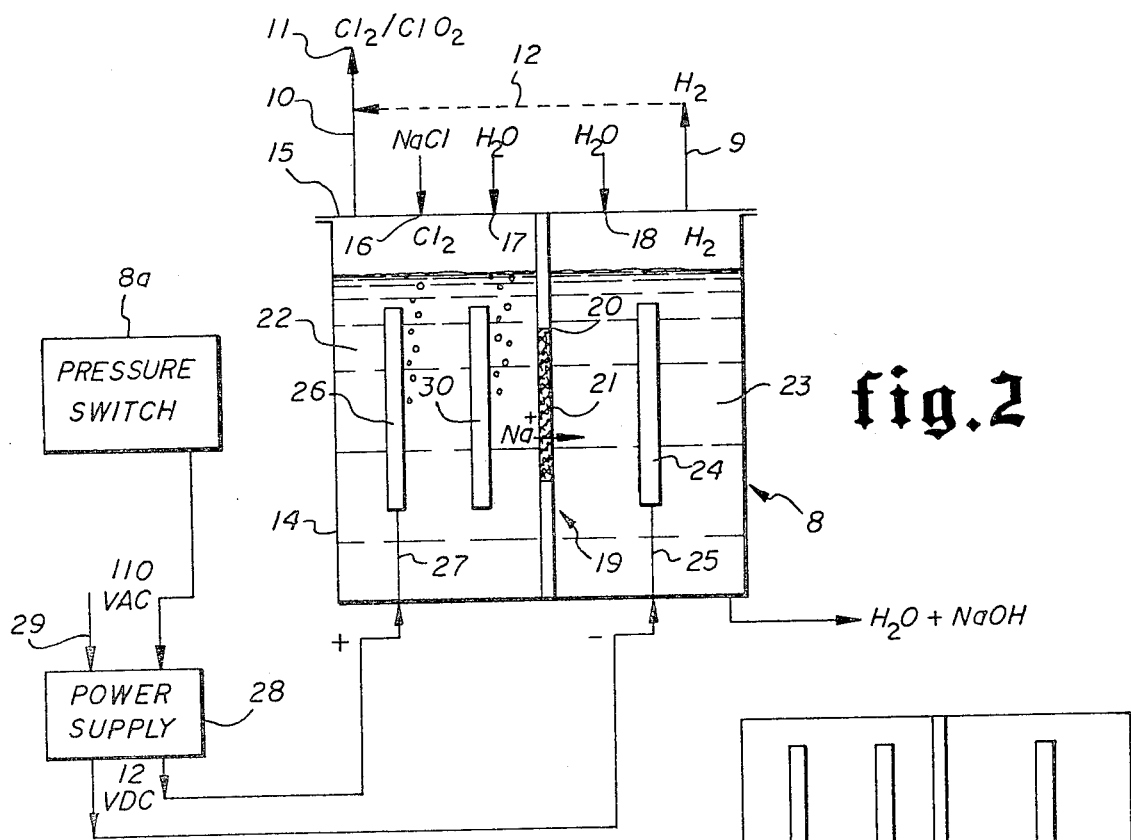
FIG. 2 is a schematic view, in elevation, of a preferred embodiment of the electrolytic generator to be used in the system shown in FIG. 1.

The electrolytic generator 8, shown schematically in FIG. 1, is of an improved design, as shown in FIG. 2 and subsequent figures of the drawings. The preferred embodiment of the chlorine generator 8, as shown in FIG. 2, produces a mixture of chlorine dioxide and chlorine gas.

In FIG. 2, electrolytic generator 8 consists of a hollow container 14 having a removable cover 15 sealed in place and having an opening 16 for introduction of a chloride salt (NaCl), and openings 17 and 18 for introduction of water. Hollow container 14 is divided by a vertically extending wall 19 which has a window opening 20 in which there is positioned ion-permeable membrane 21 which conducts cations, e.g., $Na^+$. Ion-permeable membrane 21 may be a suitable cation exchange, electrically conductive membrane of the type conventionally used in electrolytic cells provided with membrane separation of the anode and the cathode compartments. The preferred membranes are fluorinated polymers and preferably perflurosulfonic acid polymers, preferably NAFION, manufactured by Dupont.

Wall member 19 including membrane 21 divides the interior of container 14 into an anode compartment 22 and a cathode compartment 23. A cathode 24 is positioned in cathode compartment 23 and connected by electric lead 25 to a point external to container 14. Anode 26 is positioned in anode compartment 22 and is connected by electric lead 27 to a point external to container 14. The apparatus is provided with a power supply, such as, a transformer 28 powered by 110 volt power source 29 and providing a 12 volt D.C. output connected to electric leads 25 and 27. An electrically neutral or uncharged electrode 30 is positioned in anode compartment 22 in a direct line between anode 26 and cathode 24 and adjacent to ion-permeable membrane 21. Electrode 30 is electrically neutral in the sense that it is not connected by lead wire to the electric circuit energizing the anode 26 and cathode 24 to effect electrolytic decomposition of a salt solution. Electrode 30 is called a neutral electrode and is neutral in the sense defined above although it does have a measurable potential relative to the anode 26 or cathode 24 when the electrolytic circuit is energized. Electrode 30 is also known in the art as a bipolar electrode.

Figure 3:
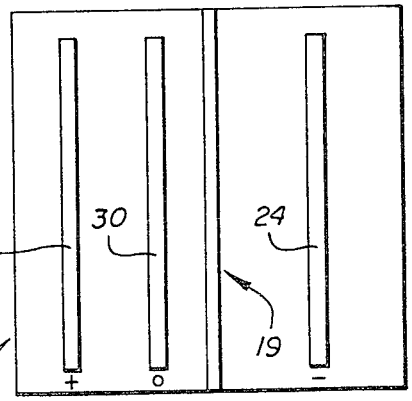
FIG. 3 is a plan view of the electrolytic generator shown in FIG. 2.

In FIG. 3, which is a plan view of the chlorine generator 8, the plate-like construction of the various electrodes 24, 26, and 30 is seen. It has been found experimentally that better yields are obtained by increasing the effective area of the anode. Thus, flat-plate electrodes are preferred in the chlorine generator of this invention although in some applications the cylindrical electrodes or other shape may be used. The cathode 24 is preferably a flat-plate or steel or the like. The anode 26 and the electrically neutral electrode 30 are preferably flat-plates of carbon.

OPERATION

The electrolytic generator described and shown in FIG. 2 and 3 has been tested and found to be a substantial improvement over more conventional electrolytic chlorine generators.

In the electrolytic generator shown, the cell is charged with water in both the anode compartment 22 and the cathode compartment 23 to a level above the top of the various electrodes but leaving a sufficient space at the top for the collection of gases. Common table salt (NaCl) was added to the water in the anode compartment. The ion-permeable membrane 21 in the cell was Dupon NAFION. Neutral or bipolar electrode 30 was placed approximately one inch from the membrane. 12 volt D.C. were applied and monitored by a D.C. amp meter in the circuit.

The system was turned on. The current flow was 0.250 amp; voltage readings of the solution were nearly constant throughout the anode compartment. This indicated that the anode compartment represented a single uniform resistance relative to the cathode. A potential difference between the anode and the neutral or bipolar element was 0.9 volts D.C. There was immediate visible generation of hydrogen at the cathode. At this current level, there is a substantial lag in the production of chlorine. After a short period of time, however, gas begins to form at both the anode 26 and neutral or bipolar electrode 30. The gas produced at the anode 26 and the neutral element 30 was unexpectedly found to consist of a mixture of chlorine and chlorine dioxide. The proportions $Cl_2$ and $ClO_2$ varied under different conditions of operation but in most cases the $ClO_2$ is present in a substantial excess over the $Cl_2$. When the current is increased to about 10–11 amp for full production, there is vigorous generation of the gas mixture at the anode 26 and the neutral or bipolar electrode 30. When operating at full voltage and full current, there is a substantial and measurable potential measured across the three electrodes in the cell. The neutral or bipolar electrode 30 is at a potential of about 8 volts relative to the cathode. The potential in the brine between the neutral or bipolar electrode 30 and anode 26 is about 10 volts. Anode 26 is at a potential of 12 volts relative to cathode 24.

Under the conditions of operation described above, there is vigorous generation of hydrogen at cathode 24 and a rapid production of sodium hydroxide in cathode compartment 23. Sodium hydroxide is the natural product obtained when the sodium ions passing through ion-permeable membrane 21 are neutralized at cathode 24. The resulting product is sodium metal which is almost instantly converted into sodium hydroxide with evolution of hydrogen. At the same time, there is vigorous generation of the gas mixture in the anode compartment 22 at both the neutral electrode 30 and the anode 26. The evolution of gas commences almost immediately compared to a relatively long induction period for production of chlorine in conventional electrolytic chlorine generators.

In the start up of a chlorine generator, there is usually a substantial induction, or lag time which results from the low conductivity in the cathode compartment. Usually, the operation of the cell is relatively slow until sufficient sodium ions have been converted into sodium hydroxide at the cathode 24 and the caustic solution has reached a sufficient level of concentration to be highly electrically conductive. Likewise, in the anode compartment, there is usually an induction, or lag time resulting from the solubility of chlorine in water, particularly when the chlorine is generated slowly. In this improved electrolytic generator there is a more rapid build up of sodium hydroxide in the cathode compartment as a result of the short distance that the sodium ions must travel from the neutral or bipolar electrode 30 to pass through ion-permeable membrane 21. Also, in this generator, the generation of the gas mixture at anode 26 and neutral or bipolar electrode 30 is so vigorous that there is an almost immediate generation of gas from the cell. The productivity of this cell was initially evaluated using the DPD colorimetric method of measuring residual chlorine in water. Data showed that at worst cell operating conditions and no temperature problems production of 1 lb. of chlorine-containing gas per day was easily obtained at a current of 11 amp and only 5 gallons of brine solution. There was no long loss of time for start up and waiting for solutions to be concentrated with salt or caustic levels to rise. In conventional electrolytic chlorine generators the lag time in start up has often been days.

In later experiments, the production of gas in the anode compartment seemed to be greater than theoretical. It was then that $ClO_2$ was discovered as a significant component of the gas produced. The anode compartment gas was collected and bubbled through an absorber for chlorine and the residue analyzed for $ClO_2$ content. The $ClO_2$ was found to be the major constituent of the gas produced in the anode compartment at both the anode 26 and the neutral or bipolar electrode 30.

In experimental work carried out with this electrolytic generator cell, a number of important observations were made. The resistance of the anode compartment is directly related to the distance of the anode to the cathode and the saturation of salt in the electrolytic solution. The production of the gas mixture at the anode and the neutral or bipolar electrode and the production of hydrogen at the cathode are directly related to the surface area of these electrodes and the current density. With a greater area of anode surface and neutral element surface and a higher current, more gas production occurs. The current flow however is limited by the resistance of the solution in the anode compartment and the rate of flow of sodium ions through ion-permeable membrane 21. The rate of flow of sodium ions through the membrane is also directly related to the caustic level of sodium hydroxide in the solution in cathode compartment 23 and is also related to the area of ion-permeable membrane 21.

By placing neutral or bipolar element 30 in the cell and locating the element in line between cathode 24 and anode 26 adjacent to ion-permeable membrane 21, substantial advantages are obtained. Neutral or bipolar electrode 30 acts as an anode relative to cathode 24 and also acts as a cathode relative to anode 26. In this manner, neutral electrode 30 assists in effecting a rapid transfer of sodium ions to cathode compartment 23 and improves the rate of build up of caustic in that compartment. It also functions to improve the $Cl_2/ClO_2$ output and to reduce the induction period or start up time for the cell.

Tests carried out with this equipment using $6'' \times 12''$ cathode, $6'' \times 12'' \times 2''$ anode, $6'' \times 12'' \times 2''$ neutral or bipolar electrode and a $2\frac{1}{2}'' \times 8''$ ion-permeable membrane has shown that once the cell is saturated with salt a high $Cl_2/ClO_2$ output can be maintained with a small membrane area being used efficiently. The optimum size for the ion-permeable membrane 21 is probably an area not substantially greater than the area required to conduct the maximum current used in the $Cl_2/ClO_2$ generator cell. The cathode 24, anode 26 and neutral or bipolar electrode 30 are preferably about the same surface area. Some difference in surface area may be used in certain specialized applications as will be described in connection with certain of the alternate embodiments of this invention.

The removal of $Cl_2/ClO_2$ mixture and hydrogen and of caustic solution from the chlorine generator cell 8 is shown schematically, as is the introduction of water and table salt to the generator. Specific construction involves conventional structure in electrolytic cells and in gas recovery from such cells. Cell structures of the type shown in almost any of the patents referred to above can be used in production of a $Cl_2/ClO_2$ generator in accordance with this invention provided that the neutral or bipolar electrode is added and ion-permeable membrane is used as described. The collection of hydrogen and of the $Cl_2/ClO_2$ mixture may involve simple gas collection apparatus and may, if desired, involve the use of systems for mixing the hydrogen and $Cl_2/ClO_2$ gas mixture with water for introduction into a body of water as described in connection with FIG. 1 above. Also, the equipment can be used in association with timers or in connection with flow controlling switches or controls or in connection with pressure responsive switches and controls as described in any of the patents listed above.

ALTERNATE EMBODIMENTS OF THE APPARATUS

In FIGS. 4 to 13 there are shown a number of alternate embodiments of the chlorine/chlorine dioxide generator shown in FIGS. 2 and 3. In these views, the chlorine/chlorine dioxide generator is shown in plan view as in FIG. 3 and is illustrated in a variety of forms using different arrangements of neutral or bipolar electrodes and/or different configurations of electrodes.

Figure 4:
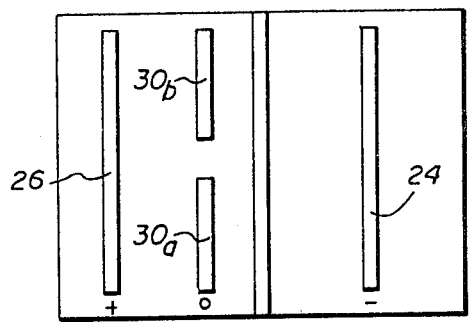
FIG. 4 is a plan view of another embodiment of electrolytic generator having a plurality of neutral or bipolar electrodes.

In FIG. 4, the chlorine/chlorine dioxide generator 8 has anode 26 and cathode 24 as in FIGS. 2 and 3. Neutral or bipolar electrode 30, however, is provided as two separate electrodes 30a and 30b. When the circuit is energized, chlorine/chlorine dioxide production occurs at anode 26 and at neutral or bipolar electrodes 30a and 30b.

Figure 5:
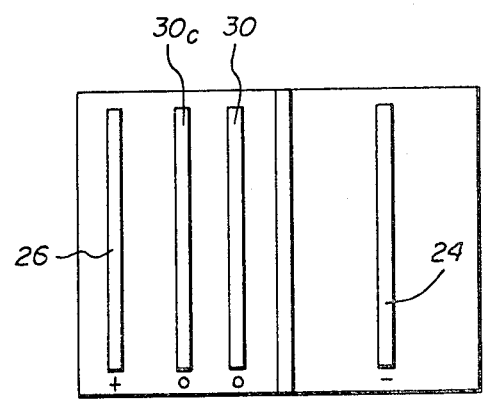
FIG. 5 is a plan view of another embodiment of electrolytic generator having a plurality of neutral or bipolar electrodes aligned in series.

In FIG. 5, chlorine/chlorine dioxide generator 8 has cathode 24 and anode 26 as in FIGS. 2 and 3. In this embodiment, neutral or bipolar electrode 30 is positioned adjacent to the ion-permeable membrane and a second neutral electrode 30c is positioned between the electrode 30 and anode 26. When circuit is energized, chlorine/chlorine dioxide production occurs at anode 26 and at each of the neutral or bipolar electrodes 30 and 30c.

Figure 6:
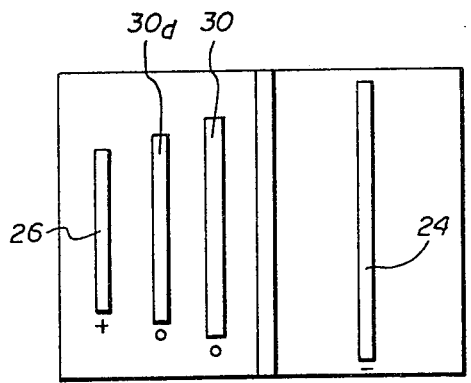
FIG. 6 is a plan view of still another embodiment of electrolytic generator having a plurality of neutral or bipolar electrodes and an anode of diminishing size.

In FIG. 6, chlorine/chlorine dioxide generator 8 has an anode 26 which is appreciably smaller in area than cathode 24. Neutral or bipolar electrodes 30 and 30d are graduated in size between the large size or cathode 24 and the small size of cathode 26.

Figure 7:
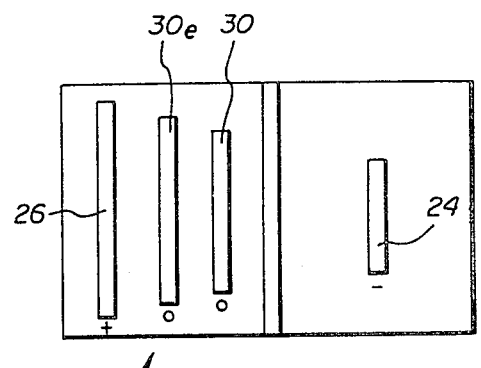
FIG. 7 is a plan view of still another embodiment of electrolytic generator having a plurality of neutral or bipolar electrodes and an anode of increasing size.

In FIG. 7, chlorine/chlorine dioxide generator 8 has a cathode 24 of relatively small size and anode 26 of substantially larger size. Neutral or bipolar electrodes 30 and 30e are graduated in size.

Figure 8:
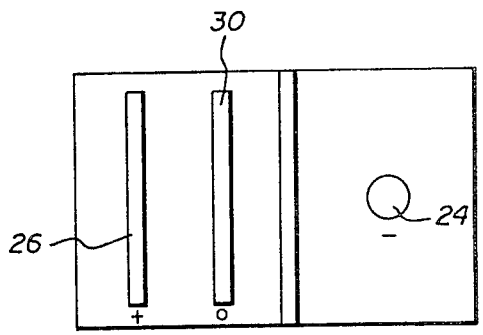
FIG. 8 is a plan view of still another embodiment of electrolytic generator having a cylindrical cathode and flat plate electrodes and an anode.

In FIG. 8, chlorine/chlorine dioxide generator 8 is substantially the same as that shown in FIG. 3, except that cathode 24 is a cylindrical rod.

Figure 9:
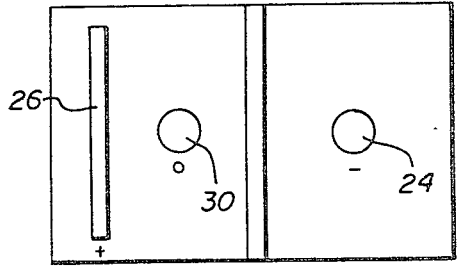
FIG. 9 is a plan view of still another embodiment of electrolytic generator in which the cathode and the neutral or bipolar electrode are cylindrical.

In FIG. 9, chlorine/chlorine dioxide generator 8 has a cylindrical rod cathode 24 a flat-plate anode 26 and a cylindrical rod neutral or bipolar electrode 30.

Figure 10:
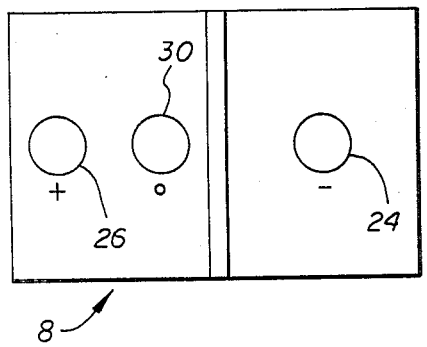
FIG. 10 is a plan view of still another embodiment of electrolytic generator in which the cathode, anode and neutral or bipolar electrode are all cylindrical in shape.

In FIG. 10, chlorine/chlorine dioxide generator 8 has cathode 24, anode 26 and neutral electrode 30 all in the form of cylindrical rods. In each of these cases, the cylindrical rod cathode is of a metal such as stainless steel and the anode 26 and neutral or bipolar electrode 30 are preferrably of carbon either in the form of a flat-plate or cylindrical rod as shown.

In the several embodiments having multiple neutral electrodes 30, viz. FIG. 4, FIG. 5, FIG. 6, and FIG. 7, the chlorine/chlorine dioxide generation takes place at the anode 26 and at each of the separate neutral or bipolar electrodes. A plurality of neutral or bipolar electrodes, two or more, may be used as desired. Chlorine/chlorine dioxide generation takes place at each of the electrodes and the anode. In the embodiment shown in FIG. 6 the current flow is focused from a large cathode 24 through sequentially smaller neutral or bipolar electrodes 30 and 30d to a smaller anode 26 to provide a higher current density. The reverse effect is obtained in FIG. 7 where the graduated neutral or bipolar electrodes 30 and 30e focus a high current from a small cathode 26 on to a larger anode 26. The embodiments in FIGS. 8, 9 and 10 illustrate the effect of substitution of cylindrical electrodes in the chlorine/chlorine dioxide generator cell.

Figure 11:
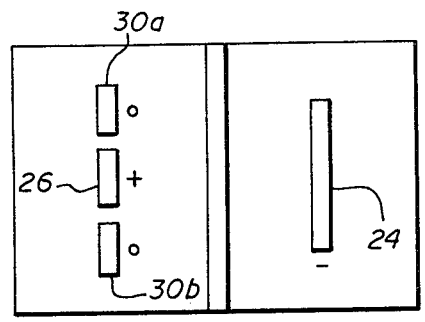
FIG. 11 is a schematic plan view of another embodiment of electrolytic generator in which the neutral or bipolar electrodes are positioned adjacent to the anode.

In FIG. 11, there is shown another embodiment of the invention in which the neutral or bipolar electrodes 30a and 30b are located adjacent to anode 26 and aligned therewith. In this embodiment, the neutral or bipolar electrodes are spaced at the same distance from the cathode 24 as anode 26 rather than being in line between the anode and cathode. The neutral or bipolar electrodes are preferably spaced closely to each side of anode 26 but not in physical contact therewith. When this embodiment is filled with saturated aqueous chloride salt, as in the other embodiments, and energized, the gas evolved at anode 26 contains 1.5 parts chlorine dioxide per part chlorine.

Figure 12:
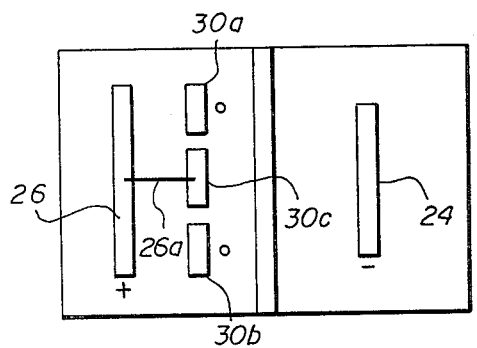
FIG. 12 is a schematic plan view of another embodiment of electrolytic generator in which a plurality of neutral or bipolar electrodes are positioned side-by-side between the anode and cathode.

In FIG. 12, there is shown still another embodiment of the invention in which a plurality of electrodes 30a, 30b and 30c are positioned side-by-side between anode 26 and cathode 24. Electrodes 30a, 30b and 30c are also considered to be positioned in parallel in an electrical sense since they represent parallel paths for current flow between anode 26 and cathode 24. The central electrode 30c is connected by lead 26a to anode 26 and is thus maintained at the same potential as anode 26, less any voltage drop through the lead, relative to cathode 24. When this embodiment is energized, the output from electrode 30c is pure chlorine dioxide while the output from anode 26 is a mixture of chlorine and chlorine dioxide.

Figure 13:
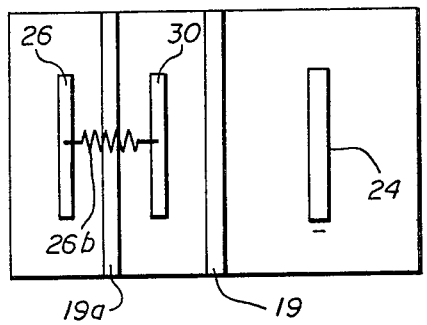
FIG. 13 is a schematic plan view of another embodiment of electrolytic generator in which the neutral or bipolar element is separated from the anode and cathode compartments by ion-permeable membranes.

In FIG. 13, there is shown an embodiment of the invention in which electrode 30 is isolated from both the cathode 24 and anode 26 by separators 19 and 19a, respectively. Anode 26 is connected by a resistor 26a to electrode 30 to maintain the same at a lower pontential than the anode relative to cathode 24. When this embodiment is energized, the output from electrode 30 is pure chlorine while the output from anode 26 is a mixture of a major amount of chlorine dioxide and a minor amount of chlorine.

Figure 14:
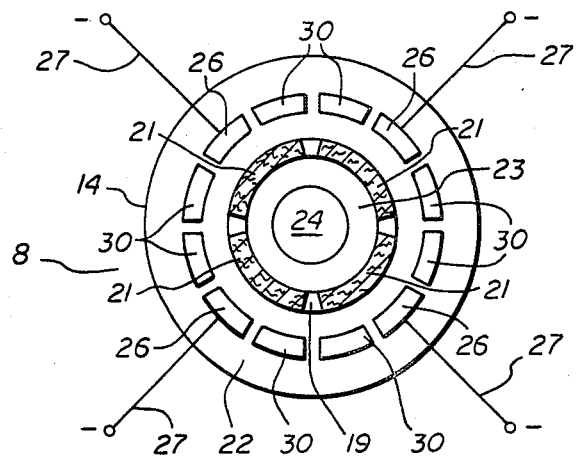
FIG. 14 is a schematic view of a cylindrical electrolytic generator.

In FIG. 14, there is shown a further embodiment in which electrolytic generator 8 is housed in a cylindrical container 14. Separator wall 19 is cylindrical and divides the generator into anode compartment 22 and cathode compartment 23. Separator wall 19 includes a plurality of ion-permeable membranes 21. Cathode 24 is positioned in compartment 23 and is connected to the D.C. power source. A plurality of anodes 26 are spaced around anode compartment 22. A plurality of neutral or bipolar electrodes 30 are positioned between anodes 26. Anodes 26 are connected to a common lead or connection to the power source. When energized, this generator produces hydrogen from compartment 23 and chlorine dioxide and a small amount of chlorine from compartment 22.

Figure 15:
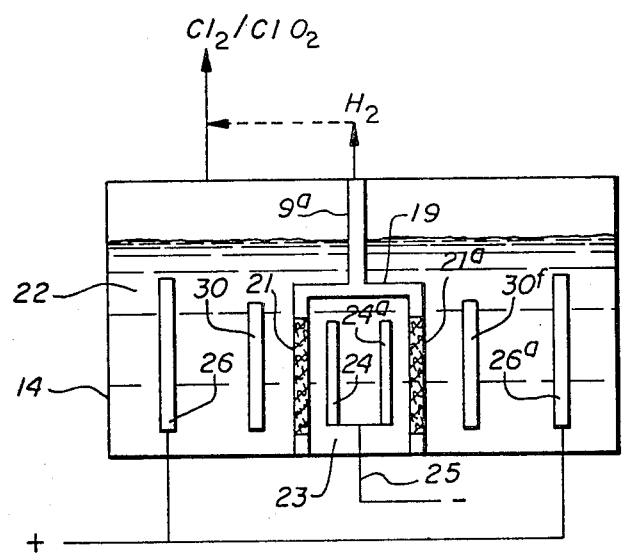
FIG. 15 is a schematic view, in elevation, of still another embodiment of electrolytic generator having a pair of cathodes and a pair of anodes.

In FIG. 15, there is shown still a further embodiment of the invention in the form of a double cell. Chlorine/chlorine dioxide generator 8 consists of hollow container 14 having wall 19 completely enclosing the cathode chamber 23. A pair of ion-permeable membranes 21 and 21a are positioned on opposite side of wall 19. A pair of cathodes 24 and 24a are provided in cathode compartment 23 and are connected to the electric circuit by lead 25. A conduit 9a leads from the end wall portion of wall 19 to conduct hydrogen from cathode compartment 23.

Anode compartment 22 completely surrounds wall 19 and the liquid level completely covers cathode chamber 23. A pair of anodes 26 and 26a are provided. A pair of neutral or bipolar electrodes 30 and 30f are provided and positioned in direct line between the respective cathodes and anodes and adjacent to the ion-permeable membrane. Chlorine is produced from each of the anodes 26 and 26a and the neutral or bipolar electrodes 30 and 30f and hydrogen and caustic are produced in cathode chamber cell is the same as the other embodiments, except that the number of electrodes is doubled.

Figure 16:
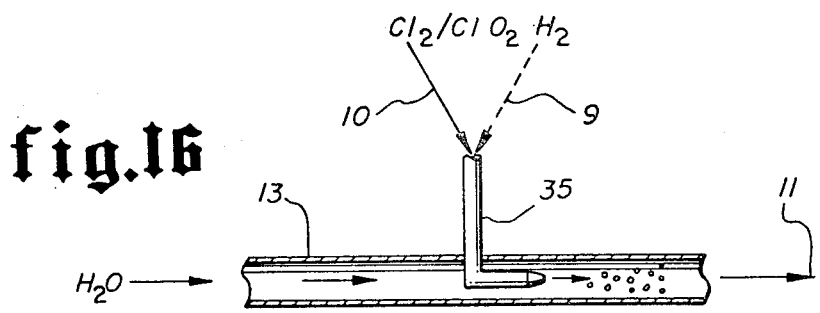
FIG. 16 is a schematic view of one apparatus for introduction of chlorine-containing mixture into a stream of water leading to the venturi mixer in the treatment shown in FIG. 1.

The output of chlorine/chlorine dioxide and hydrogen from the cell in FIG. 14 or in any of the other embodiments may be supplied as a gas directly to the mixer 7 in the system of FIG. 1 or may be introduced into a stream of flowing water indicated schematically at 13 in FIG. 1. The structure required for introducing gases hydrogen and chlorine/chlorine dioxide into water stream 13 is illustrated in FIG. 16 where there is shown conduit 13 and an injection tube 35 through which chlorine/chlorine dioxide (and optionally hydrogen) is passed and introduced into a stream of flowing water for introduction into venturi mixer 7 as indicated at 11.

The use of the apparatus described above and illustrated in the various figures of the drawings represents a new and improved method for the preparation of chlorine dioxide and mixtures of chlorine dioxide and chlorine. A variety of experiments were carried out with this apparatus to evaluate some of the parameters of the process.

DESCRIPTION OF THE PREFERRED EMBODIMENTS OF THE PROCESS

This invention utilizes the apparatus described above in a novel process for the production of chlorine dioxide and mixtures of chlorine dioxide and chlorine. It was found in the testing of this apparatus that the electrolysis of chloride salt solutions in an electrolytic cell divided into two compartments by a separator or membrane may produce chlorine dioxide or mixtures of chlorine dioxide and chlorine. In such an apparatus, one compartment contains the cathode and the other compartment contains a plurality of electrodes some of which have electrical connections as anodes and some of which are electrically unconnected and are thus neutral or bipolar electrodes or are electrodes maintained at a different potential than the anode relative to the cathode. In such an apparatus, the electrolysis of a chloride salt solution produces hydrogen at the cathode and a mixture of chlorine and chlorine dioxide at the anode or anodes and the neutral electrodes. In some arrangements of the apparatus, it is possible to isolate the production of chlorine dioxide and obtain a yield of substantially pure chlorine dioxide. Some of the variables that enter into the production of chlorine dioxid n the process are evaluated in the following experimental examples.

EXAMPLE I

In this experimental run, the electrolysis unit was essentially as described in FIG. 2 of the drawings but using two neutral electrodes as illustrated in FIG. 4. The apparatus consisted of a ten gallon container 14 divided by separator 19 which was 0.8 cm. thick and contained an ion exchange membrane 21 having a surface area of 102.6 square cm.

In normal operation, anode compartment 22 is charged with water and an excess of chlorine salt, e.g. sodium chloride, and cathode compartment is filled with water. As the electrolysis is carried out, the cathode compartment produces an aqueous solution of sodium hydroxide which becomes more and more concentrated as the reaction goes on. In the experiments that were carried out with this apparatus, anode compartment 22 was filled with a saturated sodium chloride solution and cathode compartment 23 was filled to an equal level with a solution of 30 g/l. sodium hydroxide and water. This arrangement approximates the condition of the system after it has been operated for some time.

In the equipment used in this example, anode 26 was a carbon plate and was mounted 5.0 cm. from divider 19. The neutral or bipolar elements 30a and 30b consisted of two carbon elements 2.54 cm. wide × 1.27 cm. thick × 20.32 cm. high, parallel to anode 26, and spaced 3.18 cm. apart, were mounted between anode 26 and divider 19. In this example, the neutral or bipolar elements were positioned 4 cm. from the anode and 2.8 cm. from the cathode and were adjacent to ion exchange membrane 21.

A partial partition was mounted at the top of the unit in such a manner that the partition extended below the surface of the liquid in the anode compartment 22 so that the gases evolved at anode 26 and neutral or bipolar electrodes 30a and 30b could be separately removed, without interfering with the flow of current or the circulation of ions between the various electrodes. Vapor discharge lines were provided near the top of the sides of the anode compartment to permit the escape of gases from the vapor phase in the area above the surface of the liquid in the anode compartment. A similar vapor discharge arrangement was provided near the top of the sides of the compartment in the cathode compartment to permit recovery of hydrogen.

A slight negative pressure was maintained on the anode compartment by use of an aspirator connected to a water supply and connected to the vapor discharge lines. The gases produced at the anode and the neutral element were separately removed as produced and were passed through a scrubber system to separate the chlorine and chlorine dioxide. A sodium hydroxide scrubber was placed on the suction of the separators to absorb chlorine and chlorine dioxide produced between runs.

The arrangement for separating chlorine from chlorine dioxide consisted of a separator which was a 100 ml. Nessler tube containing 90 ml. of a 10 g/liter solution of glycine in water followed by a 100 ml. Nessler tube containing 90 ml. of a 50 g/liter solution of potassium iodide which was acidified to pH 1.5 with sulfuric acid.

The glycine reacted with the chlorine to produce the monochloro and dichloro addition product with glycine. The unreacted chlorine dioxide was absorbed in the glycine solution or passed into the second tube where it reacted with the acidified potassium iodide to release iodine.

The glycine solution was analyzed for chlorine and chlorine dioxide by the D.P.D. method 409 E. Standard Methods for Examination of Water and Waste Water, 14th Edition, American Public Health Association. The potassium iodide solution was analyzed for chlorine dioxide by the Iodometric Method, 411 A, Standard Method for Examination of Water and Waste Water.

This analytical technique for separation of chlorine dioxide and chlorine is accepted as accurate when both gases are in the vapor phase as was the case in this study. Analytical results on the efficiency of the separation technique were in general agreement with those reported by Aiteta, et al., Stamford University, EPA Symposium, Cincinnati, Ohio, September 18–20, 1978, and were considered acceptable.

In this example, the electrolysis was carried out at 12 volts and 20 amp. The gases obtained from the neutral or bipolar element 30a and 30b were a mixture of 1.02 parts by weight chlorine dioxide and one part chlorine. The gases obtained from the anode 26 were a mixture of 2.22 parts chlorine dioxide and one part chlorine. The combined gases from anode chamber 22 contained 1.7 parts by weight chlorine dioxide per part chlorine.

A number of additional experiments were carried out using the same apparatus with some variations in location of electrodes, in current density, and in concentration of salt solution to determine the effect of varying these conditions of the electrolytic process.

EXAMPLES II AND III

In Example II, the apparatus and conditions of Example I were repeated except that the distance between anode 26 and neutral or bipolar elements 30a and 30b was decreased from 4 cm. to 3 cm. In this experiment, there was a production of 1.09 parts chlorine dioxide per part of chlorine at the neutral or bipolar electrodes 30a and 30b and a production of 4.50 parts chlorine dioxide per part chlorine at the anode 26. In the combined gases evolved from anode compartment 22 there were obtained 3.30 parts chlorine dioxide per part chlorine.

In Example III, the conditions of Example II were repeated but the distance between anode 26 and neutral or bipolar electrodes 30a and 30b was decreased from 3 cm. to 2 cm. In this experiment, the gases evolved at neutral or bipolar electrodes 30a and 30b contained 2.19 parts chlorine dioxide per part chlorine. The gases evolved at anode 26 contained 4.70 parts chlorine dioxide per part chlorine. In the combined gases from anode compartment 22 there were 4.08 parts chlorine dioxide per part chlorine.

EXAMPLE IV

In this experiment, the conditions of Example I were reproduced except that neutral or bipolar electrodes 30a and 30b were removed from the system. Anode 26 was spaced 6.8 cm. from cathode 24 as in Example I. The system was operated at 12 volts and 15 amp. using a saturated salt (NaCl) solution in anode compartment 22. Under these conditions, the yield from anode 26 was pure chlorine. There was no chlorine dioxide produced in the absence of neutral or bipolar electrodes 30a and 30b.

EXAMPLE V

EFFECT OF CURRENT DENSITY

A series of runs were made at 12 volts and 20 amp., 10 amp., and 5 amp., respectively. The distance between anode 26 and neutral or bipolar elements 30a and 30b were also varied as in Examples I, II and III.

The data obtained were erratic and do not correlate well at lower currents. In each case, the total volume of gas evolved was proportional to the current used. Also, the gases evolved in anode compartment 22 were a mixture of chlorine dioxide and chlorine with chlorine dioxide predominating.

EXAMPLE VI

EFFECT OF SALINITY

A series of experiments were carried out to evaluate the effect salt concentration on the production of chlorine dioxide. These experiments used a salt solution of 175 g/l which is one-half saturated. In each of the experiments, which involved a variation in spacing of the neutral electrodes and a variation in current density, there was a substantial reduction in the amount of chlorine dioxide and chlorine produced and the proportion of chlorine dioxide was significantly lower although the chlorine dioxide usually predominated.

EXAMPLE VII

An experiment was carried out using the apparatus illustrated in FIG. 13 of the drawings. The electrolytic generator was operated using a saturated salt solution and 20 amp. The voltage drop through resistor 26b was 0.04 V. The electrode 30 had a potential of 8.07 V. relative to the cathode. Anode 26 had a potential of 8.11 V. relative to cathode 24. In this run, no chlorine dioxide was produced at electrode 30 although a substantial amount of chlorine was produced. At anode 26 there was a substantial production of a mixture of chlorine dioxide and chlorine with chlorine dioxide predominating.

EXAMPLE VIII

In this run, an electrolytic generator was used as described in FIG. 12. The generator was operated using a saturated salt solution at 16 amp. current. Anode 26 and electrode 30c were maintained at a potential of 9.1 V. relative to cathode 24. Neutral or bipolar electrodes 30a and 30b were at a potential of 5.84 V. relative to cathode 24 and a potential of 3.23 V. relative to anode 26 and electrode 30c.

Under these conditions, there was a substantial production of approximately equal amounts of chlorine and chlorine dioxide as a mixture at anode 26. There was also a substantial production of gas from electrode 30c and no gas evolved at electrodes 30a and 30b. The gas evolved at electrode 30c was pure chlorine dioxide with no chlorine or other gases present.

EXAMPLE IX

In this experiment, the apparatus of FIG. 12 was used but was modified so that electric leads were connected to electrodes 30a and 30b instead of to electrode 30c. The cathode-anode potential was 9.06 V. The potential of the electrically connected electrodes 30a and 30b relative to cathode 24 was also 9.06 V. The potential of the electrically neutral or bipolar electrode 30c was 3.25 V. relative to anode 26 and 5.77 V. relative to cathode 24.

In this run, the production of gas at cathode 26 was exclusively chlorine. The production of gas at electrodes 30a and 30b was about 30% chlorine dioxide and 70% chlorine.

EXAMPLE X

In this run, the apparatus of FIG. 12 was used but all three of the electrodes 30a, 30b, and 30c were connected by electric leads to anode 26. The generator was operated at a potential of 8.91 V. for the anode 26 and electrodes 30a, 30b, and 30c relative to cathode 24 and a current of 17 amp. In this run, the production of gas at cathode 26 and at the electrically connected electrodes 30a, 30b, and 30c was entirely chlorine with no chlorine dioxide formed.

From these and other experiments, it has been possible to make some observations with respect to this new and improved electrolytic process for the production of chlorine dioxide and/or mixtures of chlorine dioxide and chlorine. It is believed that this is the first known process for the production of chlorine dioxide by electrolysis of chloride salt. This novel electrolytic process involves the use of an electrolytic cell having two compartments separated by a permeable membrane with the cathode being located in one compartment and the anode in another compartment. The anode compartment contains a plurality of electrodes at least one of which is electrically connected as an anode and one or more of which are electrically unconnected and are called neutral or bipolar electrodes. The neutral electrodes are not strictly neutral since they have a potential relative to the cathode when the system is energized. This potential results from the flow of electric current through the electrolyte from the anode to the neutral electrodes and thence through the electrolyte to the cathode. The neutral or bipolar electrodes may be located between the anode and the cathode or may be located to either side of the anode for best results. If the neutral or bipolar electrodes are located beyond the anode there is a very substantial loss of efficiency although it is possible in some circumstances to produce some chlorine dioxide. It should be noted that the electrolytic cell may have the compartments vertically disposed, if desired. In such an arrangement wall 19 and membrane 21 extend horizontally and the anode and cathode compartments are located one above the other.

In carrying out this process, any soluble chloride salt may be used, e.g. NaCl, KCl, LiCl, RbCl, CsCl, $NH_4Cl$, $MgCl_2$, $CaCl_2$, etc., although for economic reasons sodium chloride is preferred. When a chloride salt is electrolyzed in an anode compartment containing an electrically energized anode and a plurality of electrically neutral or bipolar electrodes there is a very substantial production of gas which consists of a major part of chlorine dioxide and a minor part of chlorine. In some arrangements of the anode and electrodes the electrolysis produces pure chlorine dioxide which can be recovered free from contamination with chlorine. In the case of electrolysis under conditions which produce mixtures of chlorine dioxide and chlorine, the product gases may be used for many of the purposes for which chlorine dioxide is used and may also be used for many of the purposes for which chlorine is used. This mixture is particularly efficient in disinfecting bodies of water, such as, water reservoirs, swimming pools, sewage, etc. and in bleaching chemical pulps. For reasons of safety, the gases are preferably recovered as aqueous solutions for storage or in-situ use.

While this invention has been described fully and completely with special emphasis upon several preferred embodiments, it should be understood that within the scope of the appended claims the invention may be practiced otherwise than as specifically described herein.

I claim:

1. A method of producing chlorine dioxide or mixtures of chlorine and chlorine dioxide by electrolysis of an aqueous solution of a soluble chloride salt in an electrolytic cell in which the anode and cathode are separated into compartments by a permeable membrane and which includes an electrode positioned in said anode compartment maintained at a potential lower than said anode relative to said cathode, said last named electrode being of a size and shape such that it is completely surrounded by aqueous electrolyte of the said anode compartment, said chlorine dioxide or mixture of chlorine and chlorine dioxide being produced in said anode compartment.

2. A method according to claim 1 in which said electrode is a bipolar electrode not directly connected to said anode.

3. A method according to claim 1 or 2 in which substantially pure chlorine dioxide is produced at said anode and/or said electrode.

4. A method according to claim 1 or 2 in which a mixture of chlorine and chlorine dioxide is produced at said anode and/or said electrode.

5. A method according to claim 1 or 2 in which said solution is a concentrated solution.

6. A method according to claim 1 or 2 in which said salt is sodium chloride.

7. A method according to claim 1 or 2 in which said electrode is positioned close to and along side of said anode.

8. A method according to claim 1 or 2 in which said electrode is positioned between said anode and said membrane.

9. A method according to claim 1 or 2 including a plurality of said electrodes in said anode compartment.

10. A method according to claim 2 in which there are provided a plurality of neutral or bipolar electrodes positioned in parallel between said anode and said membrane.

11. A method according to claim 2 in which there are provided a plurality of neutral or bipolar electrodes positioned in series between said anode and said membrane.

12. A method according to claim 2 in which there are provided a plurality of neutral or bipolar electrodes closely spaced to and in parallel with said anode.

13. A method according to claim 1 in which said electrode is connected by a resistor to said anode.

14. A method according to claim 1 in which gases produced in said anode compartment are collected separately from said anode and said electrode.

15. A method according to claim 1 in which there are a plurality of anodes in said anode compartment and a plurality of electrodes associated therewith.

16. A method according to claim 15 in which said anodes and said electrodes are arranged around said cathode, and said membrane comprises an enclosure around said cathode.

17. A method according to claim 1 in which the gases produced in said anode compartment are removed and mixed with water prior to further use.

18. A method according to claim 1 in which said anode compartment is further subdivided by a permeable membrane separating said anode from said electrode.

* * * * *